United States Patent [19]

Reeb, Jr. et al.

[11] 4,447,749

[45] May 8, 1984

[54] CORDLESS ELECTRIC DEVICE HAVING CONTACT INCREASING MEANS

[75] Inventors: Irvin H. Reeb, Jr., Westminster; Robert L. Beckhardt, Timonium, both of Md.

[73] Assignee: Black & Decker Inc., Newark, Del.

[21] Appl. No.: 288,027

[22] Filed: Jul. 29, 1981

[51] Int. Cl.³ .......................................... H01R 13/62
[52] U.S. Cl. ........................................ 310/71; 310/50; 320/2; 429/96; 429/100
[58] Field of Search ................. 24/243, 252 R, 252 A, 24/255 R, 259 R, 260; 310/50, 71, 47; 429/9, 96, 99, 100; 320/429, 2

[56] References Cited

U.S. PATENT DOCUMENTS 2,155,778  6/1938  Stratton ............................. 429/96
3,079,510  2/1963  Hartwig ............................. 320/2
3,343,192  9/1967  Goldstein et al. .
3,999,110  12/1976  Ramstrom et al. .
4,141,616  2/1979  Gottlieb ............................. 320/2
4,296,643  10/1981  Cornelius ........................... 74/531

Primary Examiner—J. D. Miller
Assistant Examiner—D. L. Rebsch
Attorney, Agent, or Firm—R. B. Sherer; Harold Weinstein; Charles E. Yocum

[57] ABSTRACT

A cordless electric tool in which a motor is mounted in a housing and to which housing a battery source is connected to operate the motor. The battery source is in the form of a battery pack that will be slide-fitted into the housing to be detachably connected thereto. The tool housing has a hollow portion or cavity which receives the battery pack. The motor has a pair of terminals which extend into the cavity to mate with co-acting battery terminals of the battery pack. Resilient means, preferrably an "O"-ring yieldably engages the motor terminals to increase the mechanical and electrical contact between the respective motor and battery terminals.

1 Claim, 8 Drawing Figures

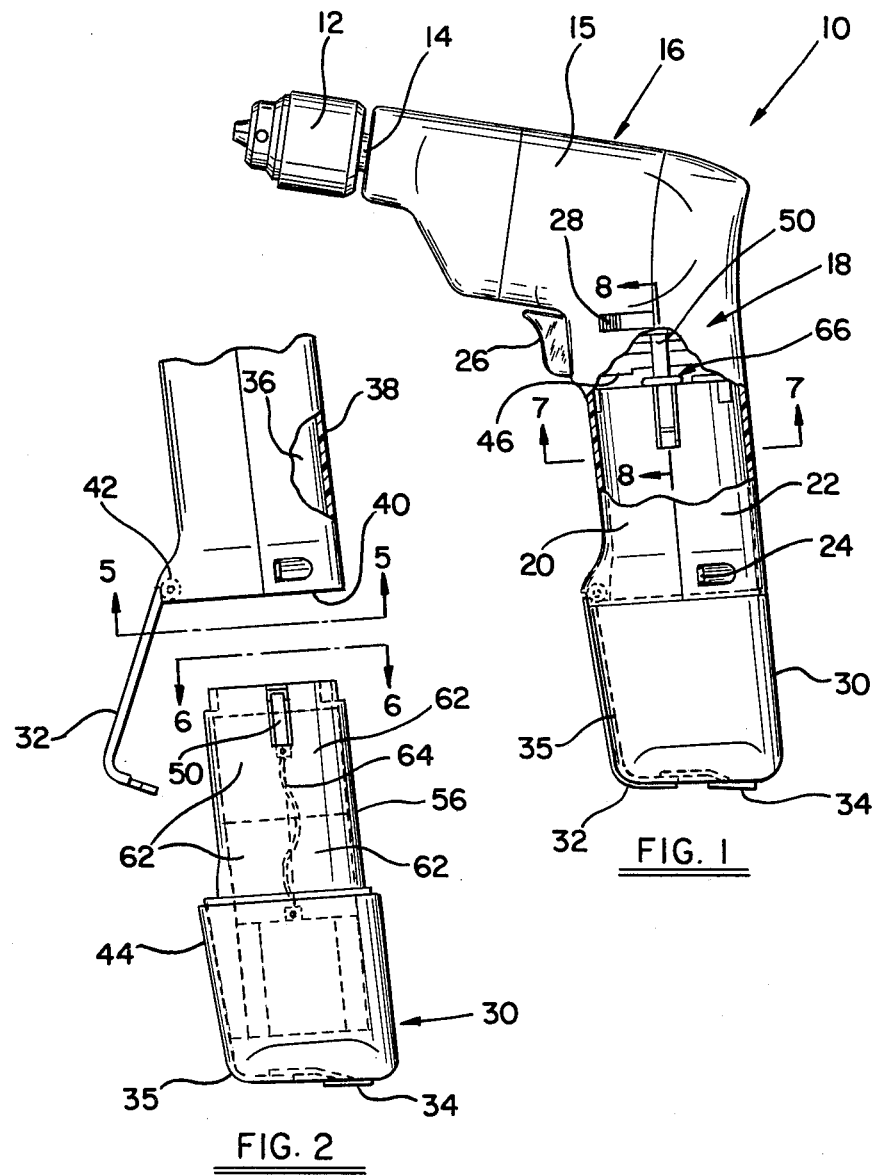

CORDLESS ELECTRIC DEVICE HAVING CONTACT INCREASING MEANS

BACKGROUND OF THE INVENTION

1. Field of the Invention

A cordless electric device such as a power tool in the form of a drill having a housing that receives a detachably connected battery pack wherein contact is repeatably made between the terminals of a motor and the a battery pack to place the motor in circuit with the battery pack. To increase the service life and reliability of the terminals and to decrease the wear thereof, the terminals are provided with resilient means to increase the mechanical and electrical connection therebetween.

2. Description of the Prior Art

Cordless electric tools of the prior art have used rechargeable batteries as is shown in U.S. Pat. No. 3,343,192. The rechargeable batteries can be mounted in a battery pack detachably connected to the housing of the cordless electric tool as is shown in U.S. Pat. No. 3,999,110, owned by the same assignee of the present invention.

Connecting the battery in circuit with the motor of a cordless electric tool can be by a plug in a socket which is similar to the common approach associated with electrical wall outlets, or by various other types of connections in which the natural resiliency of a contact terminal is used to produce the desired connection. However, due to one or more reasons, including manufacturing tolerences, wear, age or the like, such connections tend to fail at some point short of the expected life thereof.

SUMMARY OF THE INVENTION

A cordless electric device according to the present invention has a housing in which a motor is mounted. A battery source is detachably connected to the housing to operate the motor therein. A pair of motor terminals in the housing are connectable in circuit to a pair of battery terminals, respectively, of the battery source. The present invention provides a resilient means, which in the preferred embodiment is an "O"-ring, to increase the mechanical and electrical connection between the respective terminals which place the motor in circuit with the battery source.

It is an object of the present invention to provide an improved cordless electric device which overcomes the prior art disadvantages; which is simple, economical and reliable; which can be used in both existing and new devices; which provides a resilient means at the terminals to increase the mechanical and electrical contact therebetween; and which uses an "O"-ring as the resilient means.

A further object of the present invention is to provide an improved cordless electric device having a detachable battery pack and an "O"-ring at the terminals to increase the mechanical and electrical connection thereof; which terminals are electrically isolated and have the "O"-ring thereabout; which terminals extend into a hollow portion of the housing; which terminals have bent ends to facilitate the detachable connection with the battery pack; and which housing has recesses in the hollow portion in which the bent ends are disposed upon connection of the battery pack.

Other objects and advantages will be apparent from the following description of the invention, and the novel features will be particularly pointed out hereinafter in the claims.

BRIEF DESCRIPTION OF THE DRAWINGS

The invention is illustrated in the accompanying drawings in which:

FIG. 1 is a side elevational view, partly in section, of a cordless electric device such as a drill embodying the present invention.

FIG. 2 is a view, partly in section, similar to the handle portion of FIG. 1 showing the battery pack removed therefrom.

DESCRIPTION OF THE PREFERRED EMBODIMENT

Figures 3, 4:
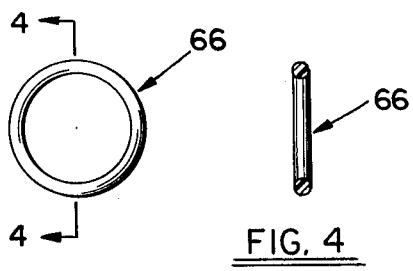
FIG. 3 is a plan view of an "O"-ring embodied in the present invention.
FIG. 4 is an elevational view taken along line 4—4 of FIG. 3.

In the illustrated embodiment of the invention a cordless electrical device, which in the preferred form is a power tool such as a drill or the like, designated generally as 10 is shown in FIG. 1. The drill 10 has a chuck 12 affixed to a rotary spindle 14 driven by a motor (not shown) mounted in a motor portion 15 of a housing 16 which has a depending handle 18 formed at the opposite end of the tool 10 from the chuck 12.

In the preferred embodiment the housing 16 is formed of a suitable plastic, with the handle 18 having a front portion 20 and a rear portion 22 held together in clam shell fashion by screws 24, only one of which is shown in FIG. 1. A trigger switch 26, having a lock and reverse button 28, is mounted in the handle 18 below the motor portion 15 of the housing 16. The trigger switch 26 is in circuit with the motor and when manually depressed will actuate the motor, upon a charged battery pack 30 being connected within the handle 18 and latched in place via a pivotal latch member 32 affixed to the bottom of the front portion 20. The latch member 32 is released by depressing a release lever 34 connected to extend from the bottom of the battery pack 30, and when the latch member 32 is connected it nests out of sight in a slot 35 form in the front of the battery pack 30.

The handle 18 shown in FIGS. 1 and 2 below the switch 26 is chamber or cavity 36 surrounded by a thin wall 38 and open at the bottom 40 which has an enlarged boss 42 extending around three sides thereof. The boss is sized to smoothly blend into the enlarged lower portion 44 of the battery pack 30 when it is slid into and connected within the handle 18.

Figure 7:
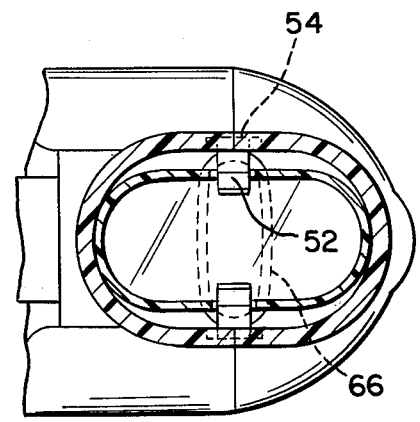
FIG. 7 is a bottom plan view, partly in section, taken along line 7—7 of FIG. 1.
Figure 5:
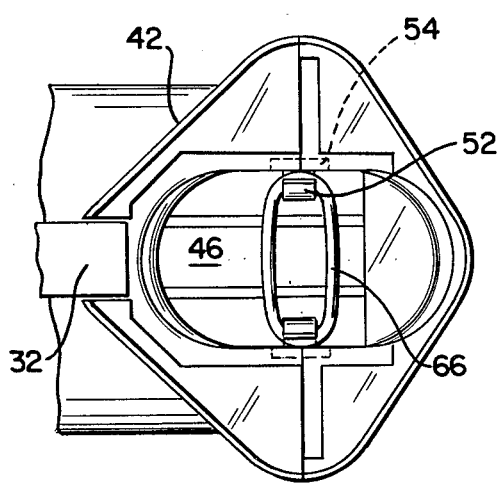
FIG. 5 is a bottom plan view taken along line 5—5 of FIG. 2.
Figure 6:
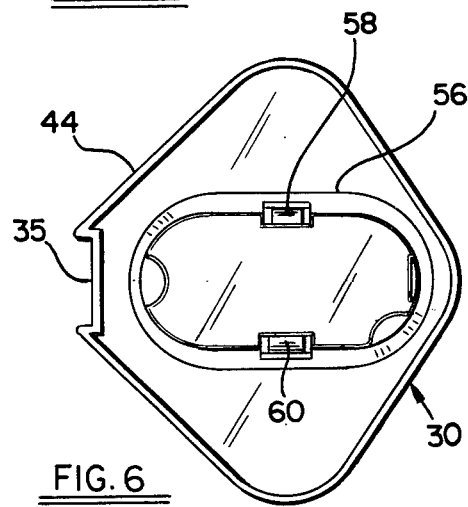
FIG. 6 is a top plan view taken along line 6—6 of FIG. 2.
Figure 8:
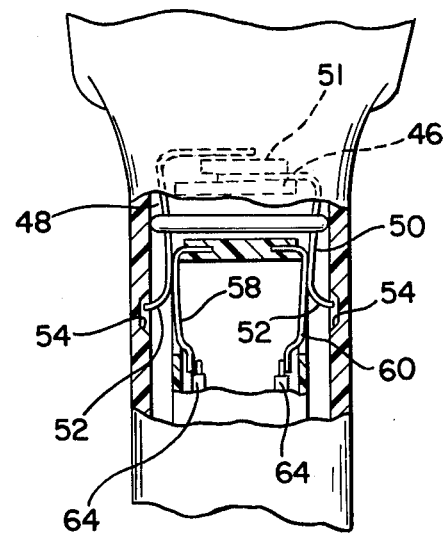
FIG. 8 is a side elevational view, partly in section, taken along line 8—8 of FIG. 1.

The switch 26 defines the upper limits of the cavity 36 and has affixed thereto a mounting plate 46 shown in FIGS. 1, 5 and 8 from the opposite side of which extends a pair of motor terminals 48 and 50 electrically isolated by dielectric member 51 from each other and in circuit with the switch 26. The terminals 48 and 50 extend downwardly into the cavity 36 a short distance from the adjacent wall 38 and parallel to each other as depicted in FIGS. 7 and 8. The ends 52 are bent outwardly, aligned with a recess 54 formed in the wall 38 and normally spaced therefrom as shown in FIG. 5 and when the battery pack 30 is inserted within the cavity 36, the upper portion 56 thereof, which carries battery terminals 58 and 60, will mate respectively with motor terminals 48 and 50 to force the motor terminals 48 and 50 to spread apart, causing the ends 52 thereof to enter the recesses 54, as shown in FIGS. 7 and 8.

The battery pack 30 as best illustrated in FIG. 2 includes an array of batteries 62 shown dotted therein and interconnected in series with a pair of lead wires 64 affixed separately to the battery terminals 58 and 60 respectively as shown in FIGS. 2 and 8. The upper portion 56 of the battery pack 30 defines a slide-in portion insertable within the cavity 30 wherein the battery pack 30 is latched by the latch member 32 received with the latch slot 35. The batteries 62 may be rechargeable nickel-cadmium, and after being charged the battery pack 30 is latch connected within the handle 18 of the housing 16 to place the tool 10 in a ready to operate condition.

To extend the life of the respective terminals 48, 50 and 58, 60 and improve the connection between the motor terminals 48, 50 and the battery terminals 58, 60 an "O"-ring 66 illustrated in FIGS. 3 and 4 is sized to fill up the space between the respective terminal 48 and 50, and the adjacent wall 38 prior to insertion of the battery pack 30. The "O"-ring 66 can thereafter be slightly squeezed to permit the closest contact between the mating motor and battery terminals 48-58 and 50-60, respectively, whereby the mechanical pressure is increased and electrical correction therebetween is improved by the added contact pressure and contact area.

The "O"-ring 66 yieldably holds the motor terminals 48,50 closer to each other without inducing fatigue, yet permits easy spread thereof upon the upper portion 56 being slide-fit within the cavity 36 to have the battery terminals 58, 60 engaged therebetween. Even in the spread position of the motor terminals 48, 50 the "O"-ring 66 provides a positive force to insure the best electrical contact between the motor and battery terminals 48-58 and 50-60, respectively. Such electrical contact reduces switch vibration and permits a lower operating temperature at such contacts so as to prevent heat build-up and possible distortion of the plastic housing components. Of course, this aids switch 26 life and added reliability to both the switch 26, the battery pack 30 and the tool 10.

It will be understood that various changes in the details, materials, arrangements of parts and operating conditions which have been herein described and illustrated in order to explain the nature of the invention may be made by those skilled in the art within the principle and scope of the invention.

We claim:

1. A cordless electric tool having a motor mounted in a housing, a control switch in circuit with the motor to operate the same, a battery source connectable to the housing, said tool comprising:
   (a) a hollow portion formed in the housing,
   (b) the hollow portion having oppositely facing walls,
   (c) a pair of resilient motor terminals individually fixedly connected in circuit with the motor,
   (d) the motor terminals extending into the hollow portion in predetermined spaced relationship to each other,
   (e) the motor terminals defining parallel legs, each of the legs having a free end bent in the direction of an adjacent wall,
   (f) a battery pack detachably connected to the housing, and having the battery source therein,
   (g) an insertion portion formed in the battery pack and said portion receivable within the hollow portion,
   (h) a pair of battery terminals spaced from each other on opposite sides of the insertion portion and individually in circuit with the battery source,
   (i) the pair of battery terminals and the pair of motor terminals to mate in individual pairs, respectively, to complete said circuit upon the battery pack's being connected to the housing, the resiliency of said motor terminals normally biasing said motor terminals into engagement with said battery terminals,
   (j) resilient means connected in superposition to said pair of motor terminals adjacent said inserted battery terminals, for urging said motor terminals into increased mechanical and electrical connection with the respective mating battery terminals and for augmenting the biasing effect of the resiliency of said motor terminals,
   (k) the resilient means including an "O"-ring made of dielectric material, and
   (l) the "O"-ring sized to fit within the space between the respective motor terminals and the adjacent wall and to be squeezed against said wall upon connection of the battery terminals to the motor terminals.

* * * * *